March 1, 1938. J. KUHN 2,110,087

MEASURING DEVICE

Filed June 21, 1937

Jacob Kuhn
INVENTOR

BY Victor J. Evans & Co.
ATTORNEYS

Patented Mar. 1, 1938

2,110,087

UNITED STATES PATENT OFFICE 2,110,087

MEASURING DEVICE

Jacob Kuhn, Rugby, N. Dak.

Application June 21, 1937, Serial No. 149,517

4 Claims. (Cl. 33—78)

The invention relates to a measuring device and more especially to a measuring attachment for X-ray film reading boxes.

The primary object of the invention is the provision of an attachment of this character, wherein accurate measurements may be had in the reading of an X-ray film as held within an X-ray film reading box and thus assuring an observer as to the extent of displacement or dislodgement of particular areas of anatomy and thus enabling one to make readings thereof when under treatment for bringing about normalcy.

Another object of the invention is the provision of an attachment of this character, wherein measurements may be had from a lineal scale or through a degree scale or both and is designated particularly for use with an X-ray film reading box for making measurements of matter disclosed by a picture through the exposure of an X-ray film and thus enabling a determination of the extent of displacement of anatomy disclosed by such picture, the attachment being susceptible of rotary adjustment as well as up and down and lateral adjustments thus enabling universal measurements to be had in the use of such attachment especially when reading an X-ray film or picture for correction of anatomy either through surgery or otherwise.

A further object of the invention is the provision of an attachment of this character, which is simple in its construction, novel and unique in its working, thoroughly reliable and efficient in operation, easy of adjustment and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
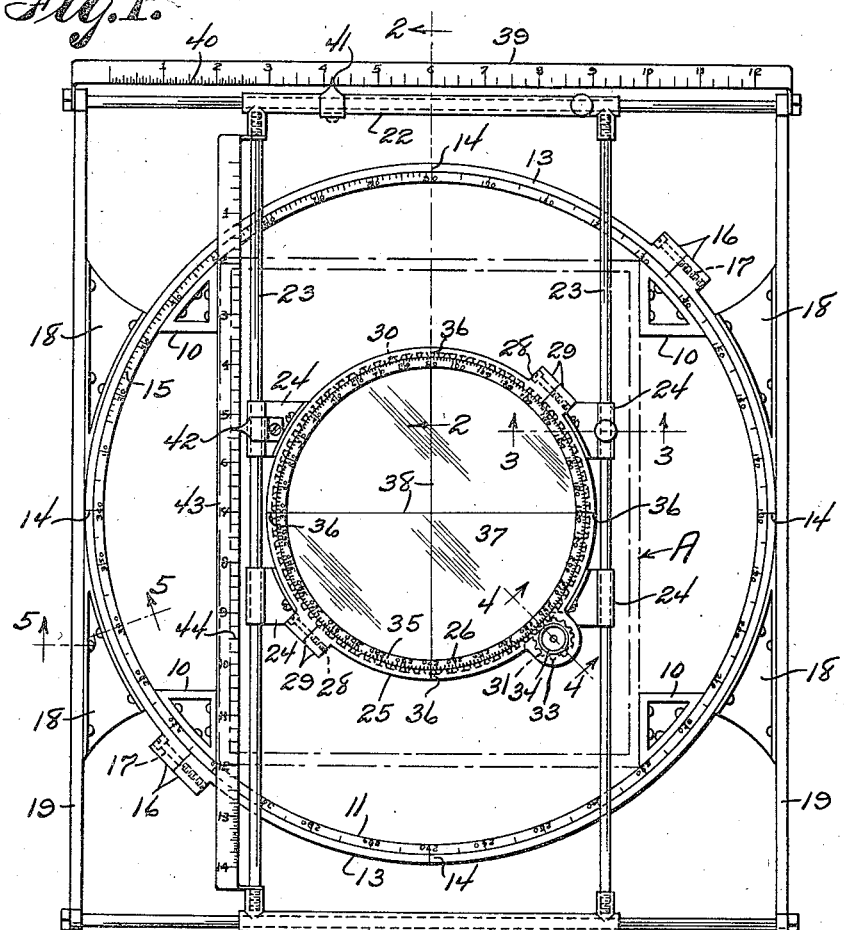
Figure 1 is an elevation of the attachment constructed in accordance with the invention showing its application by full lines to an X-ray film reading box, the latter being illustrated by dotted lines.
Figure 2:
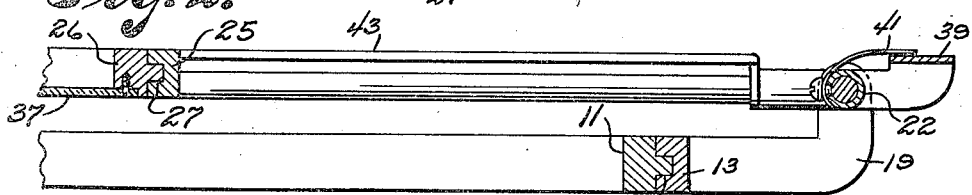
Figure 2 is an enlarged fragmentary sectional view taken on the line 2—2 of Figure 1 looking in the direction of the arrows.
Figure 3:
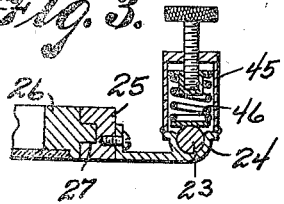
Figure 3 is a fragmentary sectional view on the line 3—3 of Figure 1 looking in the direction of the arrows.
Figure 4:
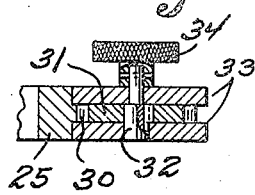
Figure 4 is a sectional view on the line 4—4 of Figure 1 looking in the direction of the arrows.
Figure 5:
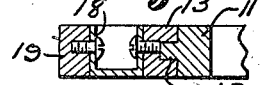
Figure 5 is a sectional view on the line 5—5 of Figure 1 looking in the direction of the arrows.

Referring to the drawing in detail, A designates generally a film reading box, that is to say, an X-ray picture and is defined in Figure 1 by dotted lines. Exteriorly of this box A next to the four corners thereof are the brackets 10 having fixed thereto and centered with respect to the box A a circular measuring scale ring 11 or stationary dial which is in association through tongue and groove connection 12 with an outer rotating ring 13 having a pointer or indicator 14 at each quarter segment thereof for coaction with a degree scale 15 as marked off from zero to three hundred and sixty degrees. This outer ring 13 is formed in two sections, these having enlarged ends 16 for alignment in proximity to each other or in abutting relation one to the other for accommodating fasteners 17 which separably join the sections of the said outer ring and the fitting thereof concentrically about and in tongue and groove connection with the inner scale ring 11.

The outer rotatable ring 13 at diametrically opposite points thereof has fitted thereto brackets 18, which also are joined with the parallel bars 19 of a gauge frame 20 to be carried by said outer ring while slidably fitting the frame 20 is a carriage 21 having the tubular ends 22 slidably fitting the frame between the bars 19 and these ends are joined with spaced parallel side rods 23 embraced by runners 24 fixed to a two-part outer ring 25 accommodating an inner rotatable scale ring 26 or rotary dial through tongue and groove connection 27 therebetween.

The sections of the outer ring 25 are separably joined with each other by fasteners 28 engaged in enlarged terminals or meeting ends 29 built on the sections of the outer ring 25. The inner ring 26, which is formed with a tongue of the tongue and groove connection with the outer ring, has provided in the latter annularly disposed rack teeth 30 with which meshes a rack gear 31, its arbor 32 being suitably journaled in an off-set bearing 33 formed with the outer ring 25 and attached to the arbor or axle 32 of said gear is a turning knob 34 for manual manipulation in rotating the inner ring 26. This inner ring 26 carries a degree scale 35 ranging from zero to three hundred and sixty degrees. The outer ring has provided on its exposed side indicator marks or pointers 36 for coaction with the degree scale 35 for marking degree adjustment of the inner ring 26.

The inner ring 26 carries a sight panel or glass 37 having crossed hair line markings 38, the crossing thereof being at the center of said panel or glass while the outer ends of the markings 38 coincide with the indicators or pointers 36 on the outer ring 25.

The frame 20 at one side has fitted therewith a scale beam 39 carrying lineal scale markings 40 while the carriage 21 at one end thereof or at that end next to the beam 39 has fixed thereto an indicator or pointer 41 coacting with the scale beam 39 or the scale markings 40 thereon for measuring purposes.

One of the runners 24 has fitted thereto an indicator or pointer 42 coacting with a scale beam 43 fitted to the carriage 21 at one side thereof and this pointer or indicator cooperates with a lineal scale 44 upon said beam 43 for measuring purposes.

Formed on another of the runners 24 is a latch barrel 45 accommodating therein an adjustable friction latch 46 for coaction with one of the side bars 23 of the carriage 21 so that the outer ring 25 will be frictionally held in adjusted position on the carriage.

By the use of the attachment, measurement readings may be had of an X-ray film or picture as within the X-ray film reading box A and the measurements had or discernible on adjustment of either rings 11 and 26 or the frame 20 or carriage 21, the inner ring 11 being stationary while the outer ring 13 fixed to the tionary while the outer ring 13 fixed to the frame 19 is rotatable on said inner ring, the latter being the measuring scale ring while the outer ring 25 is adjustably supported on the carriage 21 and the inner ring 26 is rotatable within said outer ring 25 and this inner ring being the measuring scale ring. Both measuring scale rings have a range of adjustment from zero to three hundred and sixty degrees while the carriage has a displacement of from one inch to twelve inches and the panel or glass rings 25 and 26 together have a displacement of from one inch to fourteen inches on the said carriage.

The inner ring 26 is rotated in the outer ring 25 by manual manipulation of the knob 34 as before explained.

Measurement reading of the X-ray film or picture is had through the glass or panel 37 coincident with the hair line markings 38 thereon.

In bone work this measuring device will be very handy in making all kinds of necessary measurements. A very small displacement of the spine can be determined and measured to see exactly how much of a displacement it is and after a correction of such displacement another X-ray picture may be taken and with this device again measured to see how much of a correction has taken place or if such displacement has been completely corrected. The hair line 38 in the reading area or sight panel or glass 37 is carried from normalcy of a particular part of the human anatomy and sighted with respect to said part under its displacement, the shifting of such hair line under adjustment of the device discloses through inches or fractions of an inch or degrees of scales the displacement present in the anatomy of such particular part thereof.

What is claimed is:

1. An attachment for an X-ray film reading box comprising a stationary dial ring mounted upon said box and having a degree scale, an indicator ring rotatable on said dial ring, a frame fixed to said indicator ring, a carriage movably supported by said frame, a rotatable dial ring adjustably fitted upon said carriage, means for adjusting the rotatable dial ring, means for frictionally holding the rotatable dial ring adjusted on the carriage, and a scale beam on said frame for association with said carriage.

2. An attachment for an X-ray film reading box comprising a stationary dial ring mounted upon said box and having a degree scale, an indicator ring rotatable on said dial ring, a frame fixed to said indicator ring, a carriage movably supported by said frame, a rotatable dial ring adjustably fitted upon said carriage, means for adjusting the rotatable dial ring, means for frictionally holding the rotatable dial ring adjusted on the carriage, a scale beam on said frame for association with said carriage, and a pointer on the carriage cooperating with the scale beam.

3. An attachment for an X-ray film reading box comprising a stationary dial ring mounted upon said box and having a degree scale, an indicator ring rotatable on said dial ring, a frame fixed to said indicator ring, a carriage movably supported by said frame, a rotatable dial ring adjustably fitted upon said carriage, means for adjusting the rotatable dial ring, means for frictionally holding the rotatable dial ring adjusted on the carriage, a scale beam on said frame for association with said carriage, a pointer on the carriage cooperating with the scale beam, and a scale beam on the carriage for cooperation with the rotatable dial ring.

4. An attachment for an X-ray film reading box comprising a stationary dial ring mounted upon said box and having a degree scale, an indicator ring rotatable on said dial ring, a frame fixed to said indicator ring, a carriage movably supported by said frame, a rotatable dial ring adjustably fitted upon said carriage, means for adjusting the rotatable dial ring, means for frictionally holding the rotatable dial ring adjusted on the carriage, a scale beam on said frame for association with said carriage, a pointer on the carriage cooperating with the scale beam, a scale beam on the carriage for cooperation with the rotating dial ring, and a pointer associated with the rotatable dial ring and cooperating with the scale beam on the carriage.

JACOB KUHN.